(12) United States Patent
O'Neill et al.

(10) Patent No.: US 7,824,903 B2
(45) Date of Patent: *Nov. 2, 2010

(54) SYSTEMS AND METHODS FOR GENERATING COMPOST

(75) Inventors: Frederick Timothy O'Neill, Seattle, WA (US); Christopher J. Hibbard, Seattle, WA (US); Charles A. Krauter, Seattle, WA (US)

(73) Assignee: Engineered Compost Systems, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,975

(22) Filed: Nov. 19, 2009

(65) Prior Publication Data

US 2010/0068800 A1 Mar. 18, 2010

Related U.S. Application Data

(63) Continuation of application No. 11/941,016, filed on Nov. 15, 2007, now Pat. No. 7,642,090, which is a continuation-in-part of application No. 11/557,924, filed on Nov. 8, 2006.

(60) Provisional application No. 60/735,994, filed on Nov. 9, 2005.

(51) Int. Cl.
*C12M 1/00* (2006.01)
(52) U.S. Cl. .............. 435/290.1; 435/290.2; 435/290.3; 435/290.4
(58) Field of Classification Search .... 435/290.1–290.4
See application file for complete search history.

(56) References Cited

U.S. PATENT DOCUMENTS 3,895,916 A * 7/1975 Rosner ........................ 422/242

4,288,241 A * 9/1981 Shelef .............................. 71/9

(Continued)

FOREIGN PATENT DOCUMENTS

WO 97/19901 A1 6/1997

OTHER PUBLICATIONS

Mathsen, Don, "Evaluating Compost and Biofilter Aeration Performance," BioCycle magazine, vol. 45, No. 6, pp. 20-27 (Jun. 2004).

(Continued)

*Primary Examiner*—Walter D Griffin
*Assistant Examiner*—Shanta G Doe
(74) *Attorney, Agent, or Firm*—Janet Sleath; Speckman Law Group PLLC

(57) ABSTRACT

Systems and methods for the generation of compost are provided. In one embodiment, the system for generating compost comprises a positively aerated floor, a semi gas and liquid impermeable compost cover sized to cover a compost biomass pile placed on the positively aerated floor, and a suction system positioned under or substantially close to the compost cover and generally near a top of the compost biomass pile, wherein the floor comprises a plurality of channels connected to at least one gas flow pipe installed below or above grade, wherein gas drawn by suction system at the top of the biomass compost pile maintains a negative pressure across the compost cover, thereby generating suction between the compost cover and the top of the compost biomass pile, and wherein the compost cover directs substantially all of the gas flow towards the suction system.

21 Claims, 5 Drawing Sheets

U.S. PATENT DOCUMENTS

| | | | |
|---|---|---|---|
| 4,521,517 A | 6/1985 | Gauthier | |
| 4,798,802 A | 1/1989 | Ryan | |
| 5,269,829 A | 12/1993 | Meyer | |
| 5,345,744 A | 9/1994 | Cullen | |
| 5,452,562 A | 9/1995 | Cullen | |
| 5,591,635 A * | 1/1997 | Young et al. | 435/286.1 |
| 6,099,613 A | 8/2000 | Allen et al. | |
| 6,383,803 B1 | 5/2002 | Allen et al. | |
| 2003/0157702 A1* | 8/2003 | Bard | 435/290.4 |
| 2008/0050806 A1* | 2/2008 | Binding et al. | 435/290.1 |
| 2008/0209752 A1* | 9/2008 | Thurot | 34/168 |

OTHER PUBLICATIONS

Wilson, G.B. et al., "Manual for Composting Sewage Sludge by the Beltsville Aerated-Pile Method," Grant No. S803468, Municipal Environmental Research Laboratory Office of Research and Development, U.S. Environmental Protection Agency, Cincinnati, Ohio (May 1980).

Natural Resource, Agriculture, and Engineering Service, "On-Farm Composting Handbook," http://www.css.cornell.edu/compost/OnFarmHandbook/ch4.pg29.html, pp. 29 (1992).

W.L. Gore & Associates GMBH, "The Principle of Waste Treatment with Gore Cover," http://pdf.directindustry.com/pdf/gore-electronics/the-principle-of-waste-treatmen/24941-37497.html, Germany (2001).

* cited by examiner

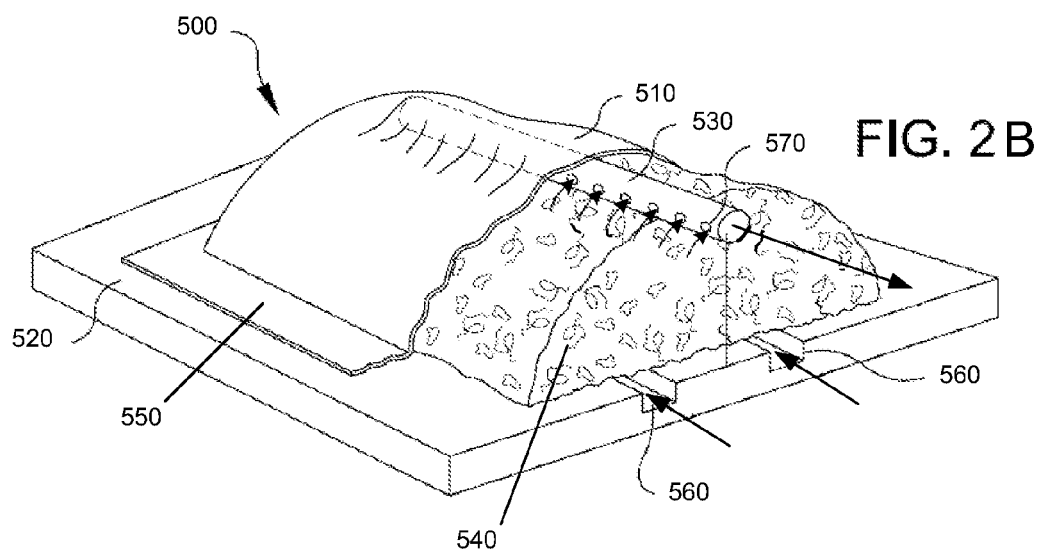

SYSTEMS AND METHODS FOR GENERATING COMPOST

REFERENCE TO RELATED APPLICATIONS

This application is a continuation of U.S. application Ser. No. 11/941,016, filed Nov. 15, 2007, which is a continuation-in-part of U.S. application Ser. No. 11/557,924, filed Nov. 8, 2006, which claims priority to U.S. provisional patent application No. 60/735,994 filed Nov. 9, 2005.

FIELD OF THE INVENTION

This invention generally relates to systems and methods for generating compost. More particularly, the invention relates to an aerated compost generation system that provides substantial reduction of compost odor emission and evaporative drying of compost.

BACKGROUND OF THE INVENTION

Composting is an effective waste management tool used to convert organic wastes into useful products. Various systems and methods for generating compost to improve the disposal and the beneficial re-use of organic wastes, such as garden waste, bio-solids, agricultural waste, municipal solid waste and the like, are known. Many of these systems and methods focus on the improvement of compost odor control, the rapid stabilization of compost, and the reduction of operating costs.

One type of compost generating system known in the art involves aeration. Generally, there are two different types of aeration: forced aeration and passive aeration. Forced, or fan-induced, aeration is generally utilized to provide sufficient oxygen for maintaining aerobic conditions of the microbes needed for compost generation. Forced aeration is also employed to maintain optimal temperature levels in order to reduce the production of odorous emissions. There are two basic types of forced aeration: positive and negative aeration. Composting systems that use positive aeration introduce air to the bottom of the compost pile, and the air exits the compost pile at the top of the pile. Composting systems that use negative aeration draw air from the surface of the compost pile, and the air is distributed down through an aeration floor and into an aeration network, where the odiferous air is treated to reduce its odor. Composting systems that utilize positive aeration have the disadvantage that ammonia and other odorous and/or corrosive gases are released from the surface of the compost pile. Systems that employ negative aeration usually have operational problems associated with the collection, removal and disposal of particulate matter and moisture drawn into the aeration networks.

Composting using passive aeration systems is generally carried out in large scale using turned windrow and passive heaps. However, these systems are commonly associated with significant compost odor emissions due to low oxygen levels, uncontrolled temperatures, and open compost piles.

In another type of compost generating system, the composting processes take place in enclosed structures. These enclosed systems are capable of capturing the odiferous air resulting from the composting process, which usually evolves at the surface of the compost pile. The captured odiferous air is then conveyed to a fan exhaust and treated for odor reduction before being released into the surroundings.

There are generally three different types of enclosed compost generating systems: in-vessel composting systems, in-building composting systems, and fabric-covered composting systems. In-vessel composting systems provide a sealed and insulated space for the biomass for each controlled volume of generated compost. In-building composting systems involve one or more open piles of compost stored in a single building, sharing a common headspace and sometimes intermingling biomass. Fabric-covered composting systems utilize a fabric, or film, to cover a discrete volume of compost, and can be used either in an enclosed structure or in an open area.

Three kinds of fabric or film covers are generally used in connection with fabric-covered composting systems. Macro-porous covers, such as the Compostex® brand, are constructed of a macro-porous fabric that is akin to a blanket. Macro-porous covers allow easy passage of air and can be used with composting systems that involve positive and/or negative aeration. Such covers are relatively thick, and provide moderate thermal insulation and minimal reduction of surface evaporation rates. They have the disadvantage that they do not control compost odors and are water-absorbent, and can therefore become heavy and difficult to transport.

Micro-porous covers are generally constructed of micro-porous, gas permeable, fabric and provide low air-flow rates. They can only be used with composting systems that involve positive aeration and require weighted edges to hold the covers in place as the covers tend to "balloon", due to gas flow constriction through the fabric. The low air flow rates result in low oxygen levels and very high temperatures of the biomass. These conditions reduce the efficiency of the aerobic bacteria that generate the compost. Micro-porous covers allow minimal passage of moisture, thereby preventing drying. In addition, most of the water soluble odiferous compounds are trapped in the water under the cover and are therefore not released into the atmosphere. Further, micro-porous covers provide little thermal insulation, are quite heavy and are very expensive.

A third type of cover used with composting systems is impermeable plastic sleeves that are adapted from silage bags used to prepare and store feed for cattle. These sleeves are generally constructed of polyethylene, have a tube configuration up to about 200 feet in length, and are filled with compost by means of a special machine. The machine can also be employed to insert a perforated aeration tube into the center of the impermeable plastic sleeve. Air ports are located along the length of the aeration tube, allowing air to be drawn in and out of the impermeable plastic sleeve. However, the resulting aeration is very uneven radially about and along the axis of the sleeve. As a result, the generated compost is usually dry on top and saturated with moisture at the bottom. In order to access the compost after processing, the plastic sleeve, or tube, is slit and disposed of, and is thus not reusable. Further, foul leachate is often released onto the ground and surroundings when the plastic sleeve is removed. Compost generated using these plastic sleeves often requires significant additional processing to obtain stability.

There thus remains a need for compost generating systems and methods that overcome the aforementioned disadvantages and problems.

SUMMARY OF THE INVENTION

Systems and methods for generating compost utilizing aeration are provided. The systems disclosed herein are capable of controlling compost odors, maintaining the desired oxygen levels in the biomass, and minimizing evaporative drying of the biomass. The disclosed systems and methods for generating compost may utilize negative or positive aeration.

In one embodiment of a negative aeration composting system, the composting system comprises a reusable compost cover formed from substantially impermeable material, and an aeration floor through which gases can be suctioned. Biomass for use in generating compost is placed on the aeration floor, and the compost cover is placed over the biomass. The edges of the compost cover, which substantially covers the biomass, may be weighted and/or connected to the aeration floor by way of strapping means connected to fastening points in the aeration floor, in order to provide a loose seal to the aeration floor. During operation, the compost cover is further held in place by the negative aeration, or suction, generated by the aeration floor.

The compost cover is formed of a material that is substantially gas and liquid impermeable, and is provided a plurality of aeration ports, or orifices, that permit the passage of gases through the cover. The size and number of aeration ports may be varied to meet the air-flow requirements for given biomass, or feed stocks, zone size and process goals. The compost cover is generally constructed of fabric that is durable, flexible, UV resistant, waterproof, and relatively light-weight.

The aeration floor may be constructed of concrete or the like, and has a generally flat, planar working surface. The surface of the aeration floor is provided with a plurality of gas flow apertures, or orifices, that connect to at least one gas flow pipe, or channel, installed below grade. In certain embodiments, a network of gas flow pipes and/or channels is provided. An air suction manifold is sealably and removably connected to at least one outlet of the network of gas flow channels and/or pipes, providing air removal from the compost biomass. The air suction manifold draws air and/or other gases downwards from the bottom area of the biomass, through the plurality of gas flow apertures in the aeration floor, and into the network of gas flow channels and/or pipes. The air travels through the network of channels and/or pipes and is conveyed towards the outlet. The air then passes through the air suction manifold to an air distributor that is sealably and removably connected to the air suction manifold. Through the air distributor, the air from the compost biomass is distributed towards a discharge manifold that directs the air towards an odor control device, such as a biofilter, where the air is treated to substantially eliminate compost odors.

The composting system may be connected to a central aeration and control system which controls the air flow, temperature, pressure and other variables of the composting system via automatic or manual means. The aeration and control system serves to deliver and modulate the air flow to maintain the desired conditions in the compost biomass. In one embodiment, the aeration and control system is automated to modulate the flow of air based on the feedback of at least one process variable. The ranges of the variables may be preset by an operator. Process variables include, but are not limited to, temperature, oxygen level, pressure, and the like.

In another embodiment of the negative aeration composting system, the composting system comprises a compost cover, an aeration floor through which gases can be removed, and at least one tubing system positioned on top of, or within, the compost pile, wherein the system is capable of providing recirculating aeration. The compost cover may be constructed of a substantially gas and liquid impermeable material, and provided with a plurality of aeration ports, or orifices, positioned on the surface of the compost cover. Alternatively, aeration ports may be omitted from the compost cover, whereby the compost cover is substantially gas and liquid impermeable. As described above, the surface of the aeration floor is provided with a plurality of gas flow apertures, or orifices that communicate with at least one, for example a network of, gas flow pipes and/or channels installed below grade. An air suction manifold that is sealably and removably connected to at least one outlet of the network of channels and/or pipes, provides suction of exhaust air from the bottom area of the compost biomass. The system additionally comprises an air distributor that is sealably and removably connected to the air suction manifold.

An air inlet is connected to the air suction manifold by way of an air modulating device, such as a valve or fan, thereby providing fresh air to the system. The fresh air is mixed with the exhaust air having low levels of oxygen which exits from an outlet of the aeration floor. The resulting mixture of fresh air and exhaust air passes to the air distributor. A portion of the air mixture is then distributed towards a discharge manifold by way of an air modulating device, such as a valve or fan, which directs the air mixture towards an odor control device, such as a biofilter.

In one embodiment, the remaining portion of the fresh and exhaust air mixture is recirculated and distributed to the compost pile by way of at least one tubing system. The tubing system, which comprises a plurality of aeration ports, is arranged generally on or below an upper surface of the compost biomass pile. The mixture of fresh and exhaust air is returned to the compost biomass pile through the aeration ports, providing recirculating aeration to the composting system. In another embodiment, the remaining portion of the air mixture is recirculated and distributed to the compost pile via the compost cover, which is provided with a network of perforated aeration channels on its surface.

In other embodiments, positive aeration composting systems are provided. In one such embodiment, the composting system comprises a compost cover, a positively aerated floor, and a suction system positioned in proximity to, or associated with, the compost cover and located near a top of a biomass pile. Biomass for use in generating compost is placed on the positively aerated floor and the compost cover is placed over the biomass. The edges of the compost cover, which substantially covers the biomass, may be weighted and/or connected to the positively aerated floor by way of strapping means connected to fastening points in the positively aerated floor, in order to provide a loose seal to the positively aerated floor. During operation, air flow drawn by the suction system at the top of the biomass pile maintains a negative pressure across the compost cover, thereby generating suction between the compost cover and the top of the compost biomass pile. The suction causes the compost cover to be substantially sealed onto the top of the compost biomass pile, preventing release of gasses from the biomass to the atmosphere.

In one embodiment, the compost cover is formed of a material that is substantially gas and liquid impermeable. In another embodiment, the compost cover is formed of a material that is semi-permeable. The compost cover is generally constructed of fabric that is flexible, durable, UV resistant, waterproof, and relatively light-weight.

The positively aerated floor may be constructed of concrete or the like, and has a generally flat, planar working surface. In one embodiment, the surface of the positively aerated floor is provided with a plurality of channels, such as trenches or pipes, that connect to at least one gas flow pipe, or channel, installed below or above grade. In another embodiment, the positively aerated floor is employed with an aeration vault forming system, described in detail below. The aeration vault forming system is placed on the upper surface of the working surface of the floor, and the compost biomass pile is placed over the top of the vault forming system.

The suction system can be in the form of a longitudinal tube or pipe, having a plurality of apertures. In one embodiment, the suction system is integral to the compost cover and the compost cover is provided with no ports or orifices. In another embodiment, the suction system is positioned external to the compost cover and is connected to at least one port or orifice provided on the compost cover.

In one embodiment, the positive aeration composting system comprises a forced air system sealably and removably connected to at least one outlet of a network of gas flow channels, pipes, trenches or an aeration vault forming system (described below), providing air to the compost biomass. In an alternative embodiment, the positive aeration composting system is not provided with a forced air system. In this embodiment, the suction through the compost cover at the top of the compost biomass pile draws atmospheric air into the network of gas flow channels, pipes, trenches, or aeration vault forming system.

In yet another embodiment of the disclosed composting system, the composting system, utilizing negative or positive aeration, comprises a generally planar working surface, an aeration vault forming system, and an optional compost cover. The aeration vault forming system is placed on the upper surface of the working surface, and a compost biomass pile is placed over the top of the aeration vault forming system. A compost cover may optionally be placed on top of the compost biomass pile. The aeration vault forming system is generally substantially hollow and may be either rigid or semi-rigid. In certain embodiments, the aeration vault forming system comprises an inflatable form. The aeration vault forming system may be left in place on the working surface, on which the compost pile is allowed to settle. Alternatively, after the compost pile settles on the aeration vault forming system, the vault forming system may be removed. When an aeration vault forming system comprising an inflatable form is employed, the inflatable form may be deflated prior to removal. Upon removal of the vault forming system, an aeration vault having substantially the same dimensions as the removed vault forming system is formed underneath, or within, the compost biomass pile.

The aeration vault may be left open at one or both ends whereby air can flow freely through the aeration vault via the open ends, allowing the compost biomass pile to be aerated. Alternatively, the one end of the aeration vault may be connected to a forced air aeration system, allowing induced aeration to take place within the negative or positive aeration composting system, wherein desirable oxygen and temperature levels of the compost biomass pile can be controlled and maintained, and the production of compost odors can be substantially eliminated.

BRIEF DESCRIPTION OF THE DRAWINGS

The present invention will be described in greater detail in the following detailed description, with reference to the accompanying drawings, wherein:

FIG. 2B shows a perspective view of a positive aeration compost generating system

DETAILED DESCRIPTION OF THE INVENTION

Systems and methods for generating compost that employ aeration to aerobically degrade and stabilize organic wastes are provided. The composting systems disclosed herein are capable of effectively controlling compost odors, maintaining desired oxygen levels in the biomass, and minimizing evaporative drying of the biomass.

Figure 1:
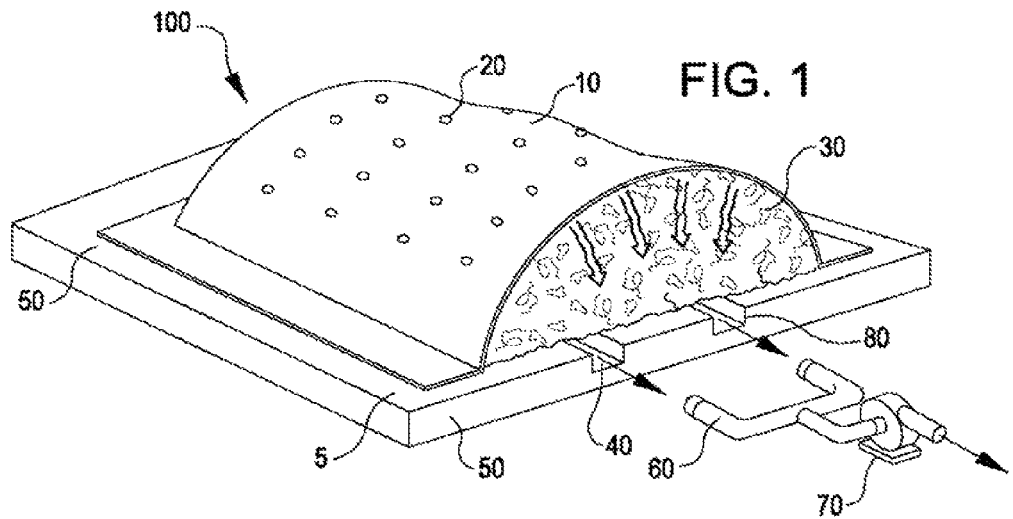
FIG. 1 shows a perspective view of a first negative aeration compost generating system.

In the embodiment shown in FIG. 1, negative aeration composting system 100 comprises at least one aerated composting zone 5. Composting system 100 is provided with a compost cover 10 and an aeration floor 50. Compost biomass 30 for use in generating compost is placed on aeration floor 50, and compost cover 10 is placed over and substantially covers biomass 30. The edges of compost cover 10 may be weighted and/or may be provided with straps that connect to fastening points in aeration floor 50. Compost cover 10 is further held in place by way of suction generated from aeration floor 50. A central aeration and control system (not illustrated) controls the air flow, temperature, pressure, and the like, of disclosed composting system 100 via automatic or manual means. In embodiments where composting system 100 is provided with a plurality of aerated composting zones, each composting zone may be controlled either independently or collectively by the central aeration and control system.

Compost cover 10 is constructed of a durable fabric that is substantially gas and liquid impermeable, and preferably reusable. Compost cover 10 is provided with a plurality of aeration ports, or orifices, 20 positioned on its surface. Aeration ports 20 are replaceable and may be constructed in any size and configuration to meet the air-flow requirements for various feedstock, zone size, and process goals. Aeration ports 20 may also be constructed to allow variable and manual sizing of their apertures, and each aeration port 20 may be provided with a one-way flow check valve. In certain embodiments, aeration ports 20 have generally circular configurations, with a diameter of from about 0.05 inches to about 1.5 inches. Aeration ports may thus measure, for example, about 0.25, 0.5 or 0.75 inches in diameter. The ports 20 may be completely open, partially open, or completely closed.

The fabric of compost cover 10 prevents the passage of gas or liquid except through aeration ports 20. Compost cover 10 is generally constructed of durable, UV resistant, waterproof, and relatively light-weight materials. As described above, compost cover 10 substantially covers compost pile 30 and is held in place to aeration floor 50, providing a loose seal. Compost cover 10 may be held in place to aeration floor 50 by means of weights provided at its edges. Alternatively, the edges of the compost cover 10 may be provided with strapping means whereby compost cover 10 may be connected to fastening means positioned on aeration floor 50. The weight means and/or strapping means act to secure cover 10 in windy conditions, as well as during recovery and deployment steps. During operation, the negative aeration of composting system 100 causes compost cover 10 to cling to the compost pile 30, thereby loosely sealing compost cover 10 to the aeration floor 50. Compost cover 10 may be placed over or removed from compost pile 30 using, for example, a commercial tarp-roller.

In another embodiment, compost cover 10 may be provided with an integrated compost pile irrigation system to maintain moisture during periods of high aeration. Compost cover 10 may also, or alternatively, be provided with an integrated air re-circulation network to introduce warm air to the upper area of the compost biomass 30.

Unlike various micro-porous compost covers known in the art, the permeability of compost cover 10 does not change over time due to soiling, and the aeration ports 20 of compost cover 10 may be constructed to permit any air flow rate. Also, unlike impermeable plastic compost sleeves, compost cover 10 is re-usable, may be readily removed from the compost pile 30 to allow turning and re-mixing of the compost, and may be integrated with an aeration floor 50 that can collect and manage condensate or leachate.

Aeration floor 50 may be constructed of concrete or the like. In one embodiment, the surface of aeration floor 50 is provided with a plurality of gas flow apertures, or orifices, that correspond to a network of gas flow channels 40 installed below grade of aeration floor 50. Pipes, tubes, conduits, hoses, trenches, ditches, gutters, dugouts, vaults formed in the compost and the like, may be use in addition to, or in place of, channels 40. In one embodiment, the gas flow apertures are provided in generally rigid covers, or plates, that are positioned on top of, and cover, gas flow channels 40. Such plates may be formed, for example, from stainless steel. An air suction manifold 60, which is sealably and removably connected to at least one outlet 80 of the network of gas flow channels 40, provides air suction from the bottom area of compost biomass 30. Air suction manifold 60 draws and distributes odorous exhaust air from compost biomass 30 through the plurality of gas flow apertures of aeration floor 50, to the network of gas flow channels 40, and through outlet 80. The air then passes through air suction manifold 60, to air distributor 70 that is sealably and removably connected to air suction manifold 60 at its inlet. Air distributor 70 may be, for example, an air blower. From air distributor 70, the exhaust air from compost biomass 30 is passed to a discharge manifold connected to the output of air distributor 70. The discharge manifold directs the air towards an odor control device (not shown) such as a biofilter. The exhaust air is then treated by the odor control device to substantially eliminate the compost odor, and the treated air is distributed into its surroundings. Aeration floor 50 is compatible with front end-loaders and is resistant to plugging by compost biomass 30.

In another embodiment, aeration floor 50 has a network of gas flow channels 40, defined by a plurality of perforated pipes, installed on-grade that provide air suction at the bottom of compost biomass 30.

The aeration and control system of disclosed system 100 serves to secure compost cover 10, and to deliver and modulate the air flow to maintain the desired conditions in the compost biomass 30. In one embodiment, the aeration and control system is automated to modulate the flow of air based on the feedback of at least one process variable. The ranges of the variables may be preset by an operator. Process variables include, but are not limited to, temperature, oxygen level and pressure. Alternatively, the aeration and control system may be controlled manually by an operator.

The process variable settings may include a minimum suction setting sufficient to keep compost cover 10 held in place to aeration floor 50 and to prevent fugitive emissions, a minimum air-flow rate sufficient to maintain a minimum oxygen level to satisfy metabolic requirements of the aerobic bacteria within the biomass, and a maximum temperature setting to avoid overheating the biomass 30.

Figure 2A:
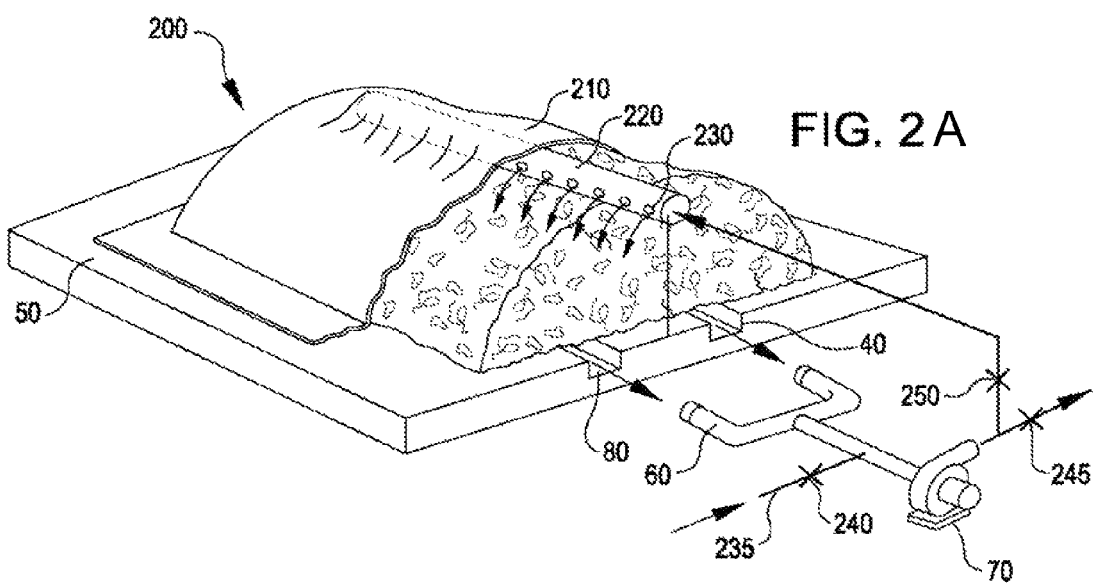
FIG. 2A shows a perspective view of a second negative aeration compost generating system.

FIG. 2A shows another embodiment of a negative aeration composting system 200. Composting system 200, which is capable of providing recirculating aeration, comprises a compost cover 210, an aeration floor 50, and a tubing system 220. In this embodiment, compost cover 210 is substantially gas and liquid impermeable. As for composting system 100 described above, the surface of aeration floor 50 is provided with a plurality of gas flow apertures that correspond to a network of gas flow pipes and/or channels 40 installed below grade. An air suction manifold 60 is sealably and removably connected to at least one outlet 80 of the network of channels and/or pipes, and provides removal of exhaust gases from the bottom area of the compost biomass 30. An air distributor 70 is sealably and removably connected to the air suction manifold 60.

An air inlet 235 is connected to air suction manifold 60, for example by way of an air valve 240, and provides fresh air to the system. The fresh air is mixed with the hot exhaust air having low levels of oxygen, which exits from outlet 80 of the aeration floor 50. The mixture of fresh air and exhaust air travels towards the air distributor 70. A portion of the air mixture is distributed towards a discharge manifold, for example by way of a valve 245, which directs the air mixture towards an odor control device, such as a biofilter.

In one embodiment, the remaining portion of the air mixture passes through an air flow control device, such as valve 250, and is recirculated to the compost pile 30 via a network of perforated aeration channels (not shown) provided in compost cover 210. In another embodiment, the remaining portion of the fresh and exhaust air mixture passes through valve 250, and is recirculated to the compost pile 30 by way of at least one tubing system 220. Tubing system 220 comprises a plurality of aeration ports, or orifices, 230, and is arranged generally on or below an upper surface of the compost pile 30, whereby the mixture of fresh and exhaust air is returned to compost pile 30, providing recirculating aeration to the composting system 200.

FIG. 2B shows an embodiment of a positive aeration composting system 500. Composting system 500 comprises a compost cover 510, a positively aerated floor 520, and a suction system 530 positioned under or substantially close to compost cover 520 and generally near a top of a biomass pile 540. Biomass for use in generating compost is placed on positively aerated floor 520, and compost cover 510 is placed over biomass pile 540. The edges 550 of compost cover 510, which substantially covers the biomass pile 540, may be weighted and/or connected to floor 520 by way of strapping means connected to fastening points in floor 520, in order to provide a loose seal to the positively aerated floor 520. During operation, air flow drawn by suction system 530 at the top of biomass pile 540 maintains a negative pressure across compost cover 510, thereby generating suction between compost cover 510 and the top of compost biomass pile 540. The suction causes compost cover 510 to be substantially sealed onto the top of compost biomass pile 540, preventing release of gasses from the biomass pile 540 to the atmosphere.

In one embodiment, the compost cover 510 is formed of a material that is substantially gas and liquid impermeable. Alternatively, compost cover 520 may be formed of a material that is semi-permeable to gas flow and comprises a plurality of micro-pores. The semi-permeable compost cover allows a low air flow rate (for example less than 0.2 cfm/ft$^2$ continuous) at the low differential low pressures (for example, less than 2 inches of static water column) inherent in the disclosed compost generating system 500. The use of a semi-permeable compost cover allows substantially all of the air flow to be directed towards suction system 530, and not through the micro-pores in the semi-permeable compost cover, thereby overcoming the low aeration rate limits of the semi-permeable cover.

The positively aerated floor 520 may be constructed of concrete or the like, and has a generally flat, planar working surface. The surface of floor 520 is provided with a plurality of channels, or pipes, 560 that connect to at least one gas flow pipe, or channel, installed below or above grade. The positively aerated floor 520 may be provided with an aeration vault forming systems as described below.

In one embodiment, the positive aeration composting system 500 comprises a forced air system (not shown) sealably and removably connected to channels 560, that provides a flow of air into the compost biomass 540. Alternatively, a forced air system is not employed and suction system 530 draws atmospheric air into channels 560 and through compost biomass 540.

Suction system 530 can be in the form of a longitudinal tube or pipe, having a plurality of apertures 570. In one embodiment, suction system 530 is integral to the compost cover 510 and the compost cover 510 has no ports or orifices. In another embodiment (not illustrated), suction system 530 is positioned external to compost cover 510 and is connected to at least one port or orifice provided in the compost cover.

In another embodiment of the positive aeration composting system (not illustrated), the system does not comprise a mechanically constructed aeration floor but comprises a working surface, a compost cover, and a suction system positioned under, or in proximity, to the compost cover and generally near a top of a biomass pile. The compost cover optionally comprises a plurality of aeration ports. In this embodiment, the air flows into the biomass pile by air leakage along the edge of the compost cover and the working surface and through the optional aeration ports. The uniformity of the air flow through the compost pile may be enhanced by building the biomass pile on a layer of material that is coarse and porous, relative to the biomass pile. Examples of appropriate material include, but are not limited to, ground wood and crushed rock.

Figure 3:
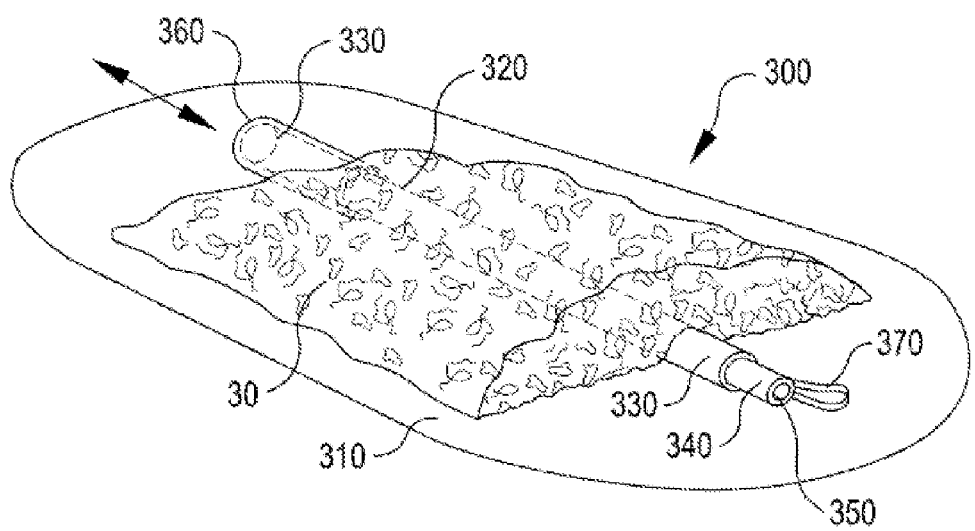
FIG. 3 shows a perspective view of a compost generating system including a first aeration vault forming system.

FIG. 3 illustrates another composting system 300. Composting system 300 comprises a working surface 310, and an aeration vault forming system 320. Composting system 300 is capable of providing positive, negative, passive or forced convective aeration. The aeration vault forming system 320 is placed on the upper surface of the working surface 310, and a compost pile 30 is placed over vault forming system 320 on working surface 310. A compost cover (not shown) may optionally be placed on top of the compost pile 30.

The aeration vault forming system 320, which has a generally elongated, tubular, configuration, is generally hollow, and may be rigid or semi-rigid. In one embodiment, aeration vault forming system 320 comprises two rigid or semi-rigid guide tubes 330 positioned at its front and rear ends, an inflatable form, such as a tube or pipe, 340 which passes through, and extends between, the guide tubes. Inflatable form 340 is provided with a fill valve 350, a pressure relief valve (not shown) and a connectable removal means 370 in proximity to one of its ends. Inflatable form 340, which may be constructed of any air resistant or microporous fabric known in the art including, but not limited to, rubberized materials, nylon or polyester fabric and other materials used in the construction of inflatable watercraft, can be inflated by means of an air supply system (not illustrated). Inflatable form 340 is generally sized such that, when deflated, its cross-section is smaller than the internal diameter of guide tubes 330, allowing removal of inflatable form 340 by pulling through guide tubes 330. When inflated, inflatable form 340 preferably has an external diameter that is the same as or greater than the internal diameter of guide tubes 330, such that tubes 330 are substantially filled by inflatable form 340. While the embodiment illustrated herein employs two guide tubes with one being positioned at each end of inflatable form 340, the aeration vault forming system may alternatively employ a single guide tube positioned at one end of the inflatable form 340.

Removal means 370 allows for easy removal of inflatable form 340 from compost pile 30 and may be in the form of pull straps, chains, loops, and the like.

In an alternative embodiment, a generally rigid form, such as a pipe, may be employed in place of inflatable form 340. Such rigid forms preferably have an external diameter that is smaller than the internal diameter of guide tubes 330. Alternatively, a generally rigid form may be employed without guide tubes.

Aeration vault forming system 320 may be left in place on working surface 310 of composting system 300. In this embodiment, at least a portion of inflatable form 340 is preferably gas permeable or semi-permeable. Alternatively, after compost pile 30 settles on aeration vault forming system 320, inflatable form 340 and guide tubes 330 may be removed from the composting system 300. When an aeration vault forming system 320 including an inflatable form is employed, the form may be deflated prior to removal from composting system 300. Typically, inflatable form 340 is inflated to a pressure of about 2.5 psi.

Figure 4:
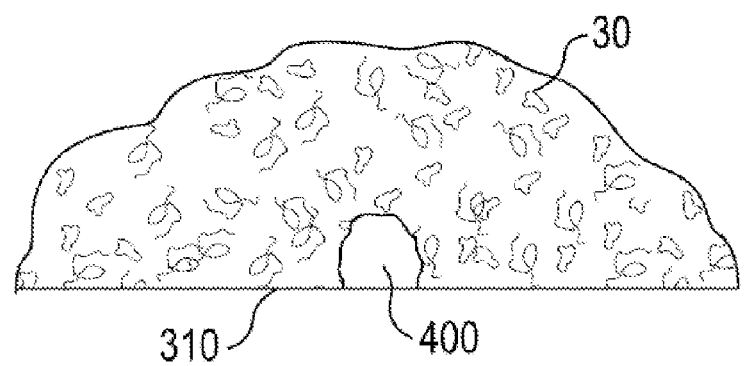
FIG. 4 shows a cross-sectional view of the compost generating system of FIG. 3.

As shown in FIG. 4, after aeration vault forming system 320 is removed, an aeration vault, or channel, 400 having a substantially arch-like, circular or oval configuration, is formed underneath the compost pile 30. Aeration vault 400 has substantially the same dimensions as inflatable form 340. Compost pile 30 is typically between about four and fourteen feet in height, and may be, for example, between about four and six feet high, between about seven and nine feet high, or between about twelve and fourteen feet high. The height of compost pile 30 is generally considerably higher than the height of aeration vault 400 in order to preserve the arch configuration of vault 400. Aeration vault 400 is typically between about six and eighteen inches, for example about 6 inches, 12 inches, 15 inches or 18 inches, in height, about six and eighteen inches wide at its base, and between fifteen to seventy five feet long. Composting system 300 may be provided with multiple, for example, two to four, formed aeration vaults 400.

Aeration vault 400 may be left open, whereby air can flow freely through vault 400 via the open ends, allowing the compost pile 30 to be passively aerated by way of natural convective aeration. Alternatively, one end 360 of vault 400 may be connected to a forced air aeration system (not shown), allowing induced aeration to take place by either positive or negative circulation within composting system 300, whereby desirable oxygen and temperature levels of the compost pile 30 can be controlled and maintained, and the production of compost odors can be substantially eliminated. In one embodiment, a generally vertical wall is provided at one end of the aeration vault forming system. This wall is provided with a passageway extending through the wall such that, when the aeration vault forming system is removed, air is able to enter the aeration vault through the passageway. The wall additionally aids in keeping compost pile 30 in place on working surface 310.

Vault forming system 320 may be connected to an air pump for inflating and deflating inflatable form 340. A vault spool may be employed for rolling the deflated inflatable form 340 following removal of the form from composting system 300.

An aeration and control system, as described above, may be connected to composting system 300.

In operation, inflatable form 340 is first unrolled off its spool and extended along the length of working surface 310. The inflatable form 340 is then connected to a first guide tube 330 at a first end of aeration vault forming system 320 and a second guide tube 330 at the second end of aeration vault forming system 320. Inflatable form 340 is fully inflated and forms a plug in both guide tubes 330. A compost pile 30 is built over inflatable form 340, for example using a bucket-loader or conveyor. The compost pile 30 is typically shaped so that guide tubes 330 have a first end exposed and a second end arranged under the full depth of compost pile 30. Compost pile 30 is then allowed to settle over approximately 2-24 hours.

Once compost pile 30 has settled, the valve at the front of inflatable form 340 is opened and inflatable form 340 is deflated. Typically, some compost falls onto the form 340 and causes uniform deflating along the entire length of inflatable form 340. If additional deflating of form 340 is required, a vacuum device can be used. After another optional brief settling time, inflatable form 340 is pulled out from compost pile 30 through guide tube 330. Compost material that has fallen from the roof of the aeration vault 400 onto the inflatable form 340 is brought out on top of the deflated form. Inflatable form 340 can be spooled directly as it is removed through guide tube 330. Guide tube 330 is then capped so that the air being pulled through the aeration vault 400 does not bypass the compost pile 30.

Composting system 300 has the advantage of low cost and is easy to use because inflatable form 340 is relatively lightweight and easy to handle. Also, since inflatable form 340 is removable, it is not in the way of the front-end loaders when the compost pile is broken down. In addition, inflatable form 340 is not susceptible to damage from the loader and is reusable. Fewer forms 340 are required because, once the aeration vault under the compost pile is formed, the form 340 can be removed.

Figure 5:
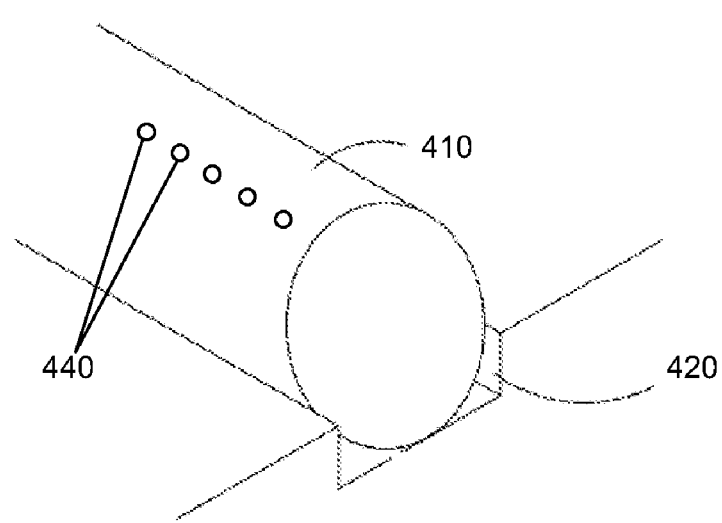
FIG. 5 shows a perspective view of a second aeration vault forming system for use in a compost generating system.

In another embodiment, illustrated in FIG. 5, an inflatable form 410 is provided in a channel or halfpipe-shaped void or trench 420 formed, or cut into, the working surface such that, when deflated, forming system 410 shrinks down into channel 420. Inflatable form 410 may thus be left in the pile during composting with minimal risk of damage from equipment such as a material moving machine. In one embodiment, inflatable form 410 is provided with a plurality of aeration ports 440 arranged along its length. When form 410 is inflated, air can be distributed into the biomass pile via ports 440, thereby providing positive aeration at a lower surface of the biomass pile. Each aeration port 440 may include a one-way check valve so that, when suction is applied to form 410, the form will shrink down into channel 420.

In one embodiment, the working surface beneath the vault forming system is a smooth and low friction working surface that facilitates removal of the vault forming system from underneath a compost pile. The low friction surface can be achieved by applying high build low friction coatings to the working surface, or by installing thin polymeric sheets in lines approximately the width of the vault forming system along on its entire length.

Figure 6:
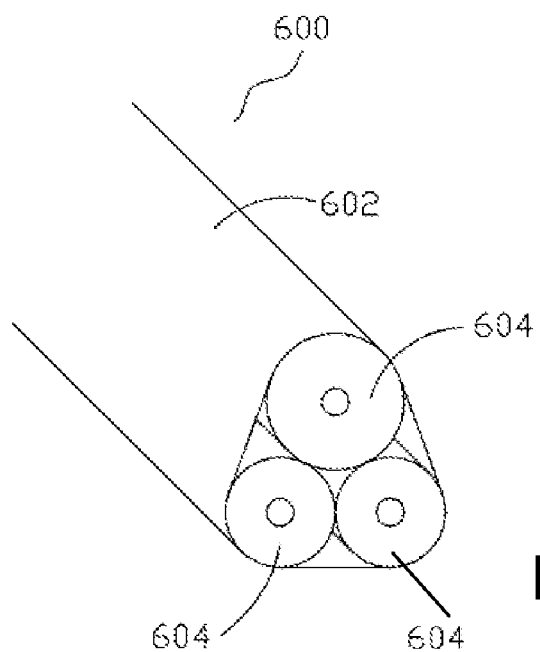
FIG. 6 shows a perspective view of a third aeration vault forming system for use in a compost generating system.

FIG. 6 shows another embodiment of an aeration vault forming system 600. System 600 comprises a sleeve of fabric material 602 and at least three generally cylindrical inflatable tubes 604 positioned inside, and extending between the ends of, sleeve 602. Sleeve 602 and tubes 604 may be positioned inside an elongated guide tube at each end of sleeve 602 and tubes 604 to facilitate positioning and removal of the aeration vault forming system. Tubes 604 are arranged in parallel with two of the tubes arranged on a lower surface, and one of the tubes arranged on top of the two bottom tubes. Each tube 604 is provided with a fill valve, a pressure relief valve, and a connectable removal means. In an alternative embodiment, sleeve 602 is omitted and the three tubes 604 are held in position by means of straps (not shown). The aeration vault forming system 600 is constructed with a cross-section that optimizes the vault's shape and the forming system's stability during deployment. The relative diameters of the tubes 604 can be varied to optimize the cross-section of the aeration vault forming system 600. In one embodiment, sleeve 602 is about 250 feet long.

In another embodiment, aeration vault forming system 600 comprises at least six rigid or semi-rigid, generally cylindrical, inflatable tubes 604 arranged in parallel with three tubes arranged on the bottom, two tubes arranged in the middle, and one tube arranged on top of the two middle tubes.

When placed under a compost pile, the aeration vault forming system 600 forms a vaulted ceiling in the shape of a structural arch. The greater the integrity of the arched vault once forming system 600 is removed, the less biomass material falls onto forming system 600 as it is deflated, and the longer the formed vault will stay intact. In another embodiment, the lower surface of the forming system 600 that contacts the working surface is widened to enhance stability during deployment. By constructing the bottom of the forming system 600 in a square-like configuration, for example, the forming system 600 can be placed without the system rolling or moving due to either biomass being dropped on to forming system 600 or windy weather conditions.

In this embodiment, forming system 600 is left under the biomass pile during the composting period. To reduce the risk of damaging the forming system 600 by material handling equipment, such as a wheel loader, the forming system 600 may be installed in a channel or half pipe-shaped voided space cut into the working surface on which forming system 600 is placed. When forming system 600 is deflated, it shrinks down into the cut voided space and is positioned below the working floor, out of the reach of material handling equipment. The void space only needs to be large enough to accommodate the deflated forming system 600, and thus the voided space can be relatively small in cross-section compared with a standard aeration channel.

The fluid pressure in forming system 600 must be high enough to support the static weight of the biomass pile being built over the top of forming system 600. In one embodiment, the fluid pressure in forming system 600 is between 0.5 and 5.0 psi. Since the forming system 600 needs to be left in place for a period of time sufficient to allow the biomass pile to settle prior to removal (1-24 hours), the fluid pressure must be maintained in the proper range during this period. The fluid pressure can increase due to biologically driven temperature increases within the biomass media, which causes air to expand. Conversely, the fluid pressure can decrease due to small perforations in the forming system 600 occurring in the course of use. In order to maintain the proper pressure, system 600 may additionally comprise a pressure maintenance device connected to the inflation/deflation port(s), and comprising a pressure regulator and a higher pressure air source.

Figure 7:
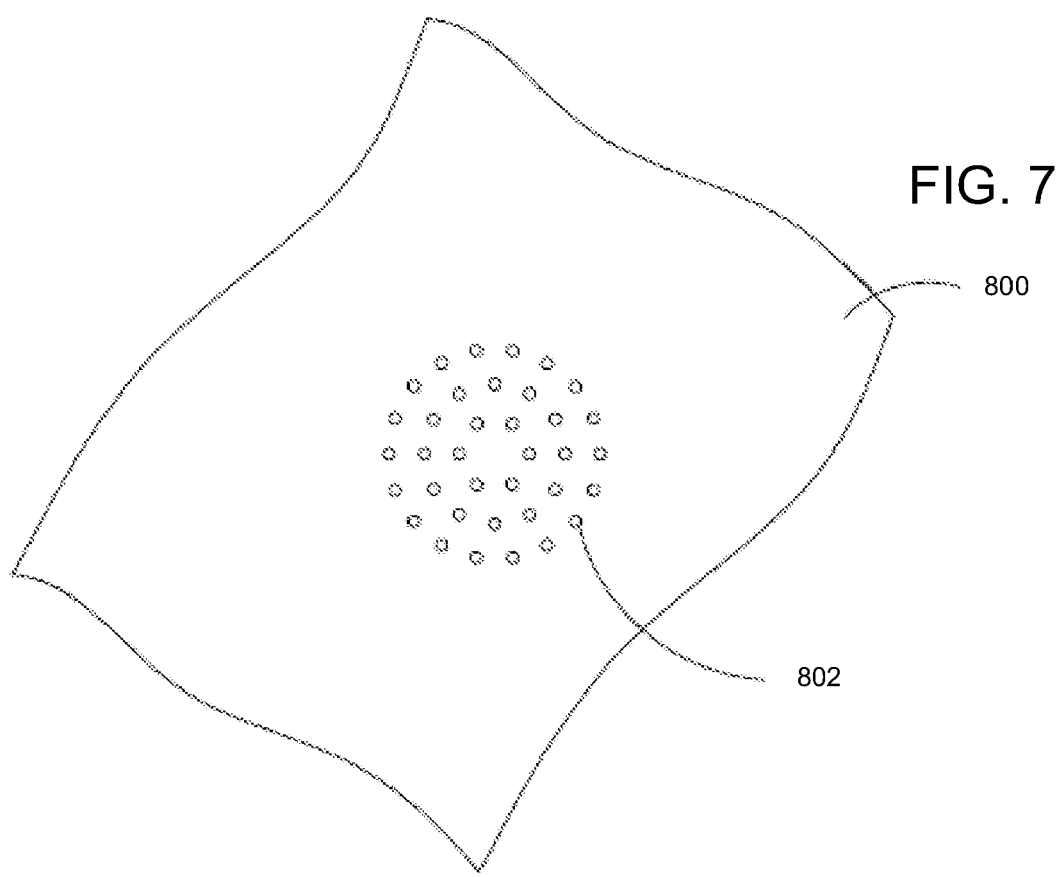
FIG. 7 shows an air-permeable compost cover for use with the disclosed compost generating systems.

Several of the composting systems disclosed herein employ a compost cover that is provided with aeration holes or ports that permit the flow of air through the cover. In one embodiment (shown in FIG. 7), compost cover 800 is provided with a plurality of aeration holes 802 that are clustered together in a tight pattern, leaving large areas of cover 800 intact. This clustering of holes 802 maintains the strength of cover 800 while allowing gas, such as air to pass through the cover. Holes 802 may have a diameter of about 1/16-1/4 inch. In one embodiment, holes 802 are provided in a cluster consisting of 36 holes, each with a diameter of 1/8 inch and with a distance of about 1/4 inch between each hole. Several such clusters of holes may be provided in a single cover, depending on the size of the cover, with the distance between each cluster being in the range of about 3 to 5 feet.

While certain embodiments of the present invention have been described in detail, it will be understood that various changes could be made in the above constructions without departing from the scope of the invention. It is thus intended that all matter contained in the above description or shown in the accompanying drawings shall be interpreted as being illustrative and not limiting.

We claim:

1. A system for generating compost, comprising:
   (a) a working surface for supporting a compost biomass pile; and
   (b) an aeration vault forming system positioned on an upper surface of the working surface,
   wherein the aeration vault forming system is capable of forming an aeration vault in a lower portion of the compost biomass pile that allows aeration of the compost biomass pile.

2. The system of claim 1, wherein the aeration vault forming system has an elongated, tubular configuration.

3. The system of claim 1, wherein the aeration vault forming system comprises an elongated tubular sleeve.

4. The system of claim 3, wherein the aeration vault forming system further comprises a tube that encloses an end portion of the elongated tubular sleeve.

5. The system of claim 4, wherein the elongated tubular sleeve has a cross-section that can be reduced in size to be smaller than an internal diameter of the tube.

6. The system of claim 1, wherein the aeration vault forming system comprises a vaulted ceiling having a structural arch shape.

7. The system of claim 1, wherein the aeration vault forming system has a square-like configuration at its lower surface for enhancing stability during deployment of the forming system.

8. The system of claim 1, wherein the aeration vault forming system is positioned in a channel provided on an upper surface of the working surface, whereby the aeration vault forming system shrinks down into the channel when deflated.

9. The system of claim 1, wherein an end of the aeration vault is connected to a forced air aeration system, thereby allowing induced aeration to take place within the composting system.

10. The system of claim 1, wherein the aeration vault is open at least one end, thereby allowing passive aeration to take place within the composting system.

11. The system of claim 1, further comprising a pump connectable to the aeration vault forming system.

12. The system of claim 1, further comprising a wall positioned at an end of the aeration vault forming system and having an passageway formed therethrough, whereby air is able to flow through the passageway and into the aeration vault.

13. The system of claim 1, wherein the aeration vault forming system is connected to a pressure maintenance device.

14. The system of claim 13, wherein the pressure maintenance device maintains fluid pressure between 0.5 and 5.0 psi.

15. The system of claim 2, wherein the aeration vault forming system further comprises a plurality of aeration ports arranged along a length of the elongated tubular sleeve for distributing air into the compost biomass pile when the aeration vault forming system is inflated.

16. The system of claim 15, wherein each of the plurality of aeration ports comprises a one-way check valve that prevents movement of gas into the aeration vault forming system.

17. A system for generating compost, comprising:
   (a) a working surface for supporting a compost biomass pile; and
   (b) an aeration vault forming system positioned on an upper surface of the working surface and comprising an inflatable elongated tubular sleeve,
   wherein the aeration vault forming system is capable of forming an aeration vault in a lower portion of the compost biomass pile that allows aeration of the compost biomass pile.

18. The system of claim 17, wherein an end of the aeration vault is connected to a forced air aeration system, thereby allowing induced aeration to take place within the composting system.

19. The system of claim 17, wherein the aeration vault is open at least one end, thereby allowing passive aeration to take place within the composting system.

20. The system of claim 17, wherein the aeration vault forming system further comprises a guide tube that encloses an end portion of the elongated tubular sleeve.

21. The system of claim 20, wherein the elongated tubular sleeve has a cross-section that can be reduced in size to be smaller than an internal diameter of the guide tube.

* * * * *

UNITED STATES PATENT AND TRADEMARK OFFICE
CERTIFICATE OF CORRECTION

| | |
|---|---|
| PATENT NO. | : 7,824,903 B2 |
| APPLICATION NO. | : 12/621975 |
| DATED | : November 2, 2010 |
| INVENTOR(S) | : Frederick Timothy O'Neill, Christopher J. Hibbard and Charles A. Krauter |

It is certified that error appears in the above-identified patent and that said Letters Patent is hereby corrected as shown below:

| Col. No. | Lines | Edits |
|---|---|---|
| 14 | 2 | Replace "open at least one" with --open at at least one-- |
| 14 | 41 | Replace "open at least one" with --open at at least one-- |

Signed and Sealed this
Twenty-eighth Day of December, 2010

David J. Kappos
*Director of the United States Patent and Trademark Office*